United States Patent
Bhairagond et al.

(10) Patent No.: US 10,759,316 B2
(45) Date of Patent: Sep. 1, 2020

(54) DYNAMIC ADJUSTABLE ARMREST

(71) Applicant: GM Global Technology Operations LLC, Detroit, MI (US)

(72) Inventors: Vinay C. Bhairagond, Bengaluru (IN); Kiran Kumar Siddegowda, Bengaluru (IN); Pramod Lockhande, Bangalore (IN); Navinkumar J. Singh, Bengaluru (IN); John Bosilkovski, Shelby Township, MI (US); Helio M. Queiroz, Royal Oak, MI (US); Alan Denys Aldrete Meza, Toluca (MX); Eliseo Arturo Flores Diaz, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 16/214,794

(22) Filed: Dec. 10, 2018

(65) Prior Publication Data
US 2020/0180481 A1    Jun. 11, 2020

(51) Int. Cl.
*B60N 2/75* (2018.01)
*A47C 1/03* (2006.01)

(52) U.S. Cl.
CPC ............... *B60N 2/77* (2018.02); *B60N 2/78* (2018.02); *A47C 1/0303* (2018.08)

(58) Field of Classification Search
CPC ............ B60N 2/77; B60N 2/78; A47C 1/0303
See application file for complete search history.

(56) References Cited

U.S. PATENT DOCUMENTS

| | | | | |
|---|---|---|---|---|
| 5,052,378 A | * | 10/1991 | Chitwood | A61H 1/0222 606/242 |
| 5,931,537 A | * | 8/1999 | Gollin | A47C 1/03 297/411.27 |
| 2005/0284907 A1 | * | 12/2005 | Kaiser | B60R 13/0275 224/543 |
| 2007/0057560 A1 | * | 3/2007 | Fookes | A47C 1/03 297/411.35 |
| 2007/0205638 A1 | * | 9/2007 | Schlecht | B60N 2/757 297/113 |
| 2012/0205958 A1 | * | 8/2012 | Colasanti | A47C 1/03 297/411.36 |
| 2014/0175850 A1 | * | 6/2014 | Roeglin | B60N 2/753 297/411.38 |

FOREIGN PATENT DOCUMENTS

| | | | | |
|---|---|---|---|---|
| DE | 3930270 A1 | * | 3/1991 | ............... B60N 2/78 |
| DE | 10359191 A1 | | 7/2005 | |
| DE | 102006053329 A1 | | 5/2007 | |
| DE | 102008050953 A1 | | 4/2010 | |
| EP | 0178171 A2 | * | 4/1986 | ............... B60N 2/797 |
| EP | 1544028 A1 | * | 6/2005 | ............... B60N 2/77 |
| EP | 2003015 A2 | * | 12/2008 | ............... B60N 2/78 |
| FR | 2882306 A1 | * | 8/2006 | ............... B60N 2/77 |
| WO | WO-2005118335 A1 | * | 12/2005 | ............... B60N 2/77 |

* cited by examiner

*Primary Examiner* — Lori L Lyjak

(57) ABSTRACT

A dynamic adjustable armrest includes a bracket supporting the armrest, a rod guide having a plurality of detents, the rod guide in slidable communication with the bracket, a locking rod engageable with the rod guide and the bracket. The locking rod is movable between at least a first position and a second position, and the armrest is movable between at least an up position and a down position.

20 Claims, 8 Drawing Sheets

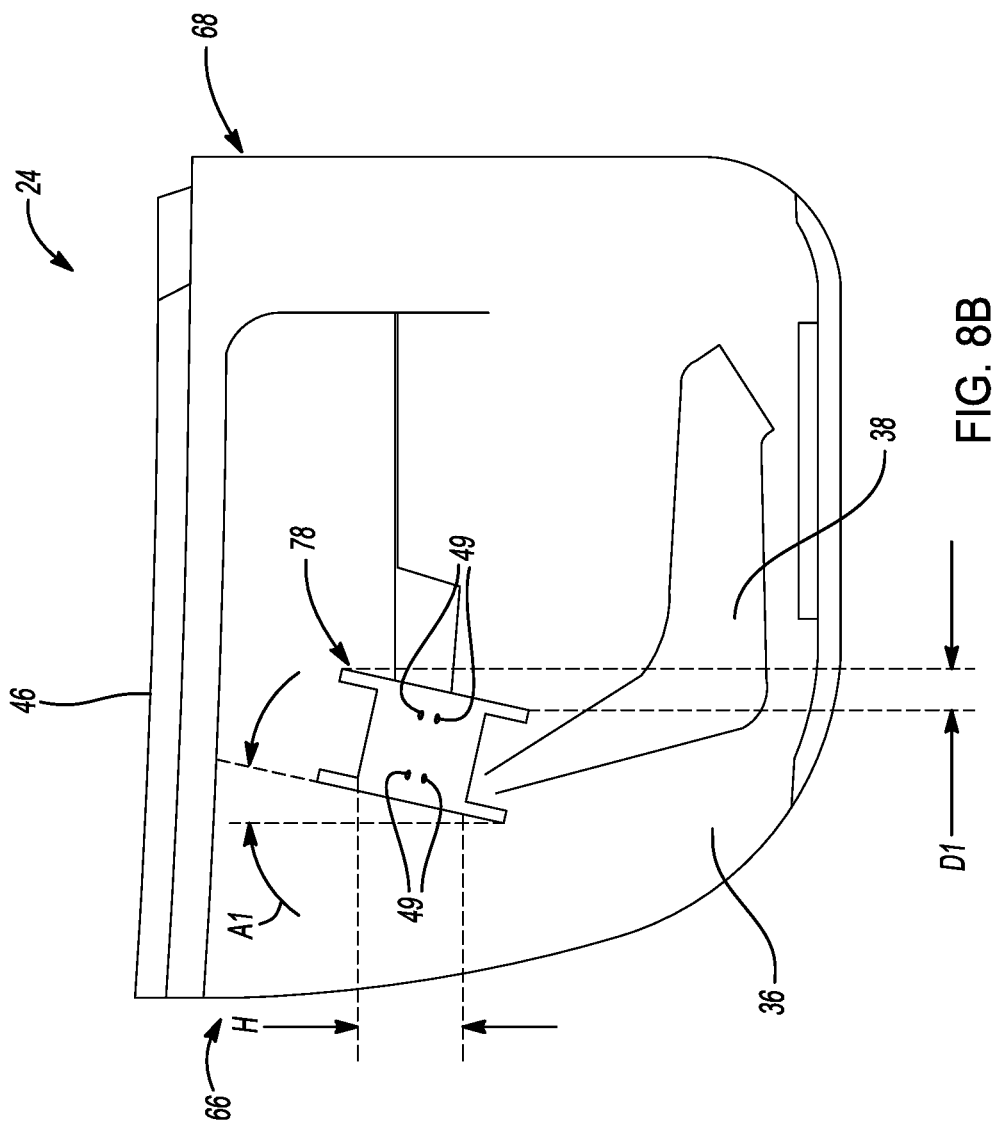
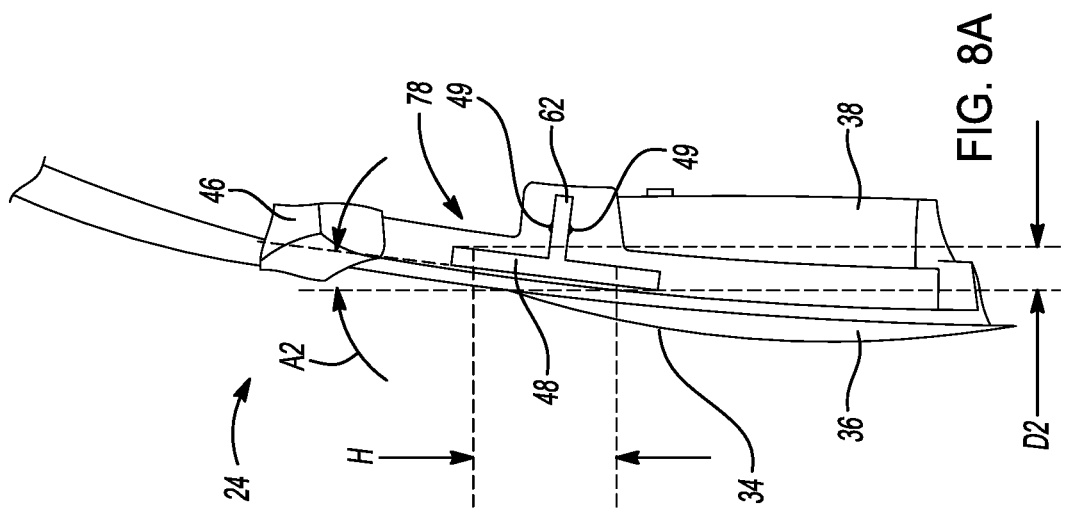

DYNAMIC ADJUSTABLE ARMREST

INTRODUCTION

The present disclosure relates to motor vehicles, and more specifically to motor vehicle interior armrests. Because motor vehicle occupants often spend significant portions of their days sitting inside their motor vehicles, motor vehicles are typically equipped not only with a variety of safety features, but a number of comfort amenities. Additionally, the ergonomic design of motor vehicle interiors is an important aspect in adding safety, reducing repetitive stress injuries, and increasing occupant comfort. Seating position relative to various hard points within the motor vehicle interior is carefully managed and calculated to provide an ergonomically sound position for a wide swath of the occupants who might potentially sit within a given vehicle. However, because the body size, shape, and proportions of potential occupants can vary wildly, it can be difficult to produce a seating position that allows all potential drivers to reach the steering wheel, pedals, gear lever, and the like, while also providing easy and comfortable use of other ergonomic features of the passenger compartment such as the armrests.

Accordingly, there is a need in the art for an ergonomically-designed armrest that can be produced simply at relatively low cost, and that is accessible and comfortable to use by occupants having substantially different physical characteristics, while improving occupant comfort for long and short periods of use, reducing the potential for injuries, and increasing occupant safety.

SUMMARY

According to several aspects of the present disclosure, a dynamic adjustable armrest includes a bracket supporting the armrest, a rod guide having a plurality of detents, the rod guide in slidable communication with the bracket, a locking rod engageable with the rod guide and the bracket. The locking rod is movable between at least a first position and a second position, and the armrest is movable between at least an up position and a down position.

In another aspect of the present disclosure, the locking rod is selectively engageable with each of the plurality of detents.

In yet another aspect of the present disclosure, the dynamic adjustable armrest includes a button, the button movable between at least an unpressed position and a pressed position.

In yet another aspect of the present disclosure, a biasing member biases the locking rod towards the first position.

In yet another aspect of the present disclosure, when the button is in the unpressed position, the locking rod engages with at least one of the plurality of detents, and the armrest is immobilized in a locked position.

In yet another aspect of the present disclosure, when the button is in the pressed position, locking rod is displaced in a direction opposite to a direction of the bias of the biasing member, the locking rod disengages with at least one of the plurality of detents, and the armrest is movable in an unlocked position.

In yet another aspect of the present disclosure, the plurality of detents further include a first end detent, and a second end detent. The first end detent engages with the locking rod to limit upward movement of the armrest and the second end detent engages with the locking rod to limit downward movement of the armrest.

In yet another aspect of the present disclosure, a first vertical distance between each of the plurality of detents is about 10 mm, and a second vertical distance from the down position and the up position is between about 10 mm and about 40 mm.

In yet another aspect of the present disclosure, the second vertical distance is between about 20 mm and about 30 mm.

In yet another aspect of the present disclosure, the rod guide is mounted to a structural support of a motor vehicle passenger compartment, the rod guide is mounted at an angle, and as the armrest is moved between the down position and the up position, the armrest moves longitudinally between about 5 mm and about 20 mm.

In yet another aspect of the present disclosure, as the armrest is moved between the down position and the up position, the armrest moves laterally up to about 6 mm.

In yet another aspect of the present disclosure, a dynamic adjustable armrest includes a bracket supporting the armrest, a rod guide mounted to a structural support of a motor vehicle passenger compartment, the rod guide having a plurality of detents, the rod guide in slidable communication with the bracket, and a locking rod engageable with the rod guide and the bracket, and the locking rod is selectively engageable with each of the plurality of detents. The locking rod is movable between at least a first position and a second position, and the armrest is movable between at least an up position and a down position, and a biasing member biases the locking rod towards the first position.

In yet another aspect of the present disclosure, the dynamic adjustable armrest further includes a button, the button movable between at least an unpressed position and a pressed position, and when the button is in the unpressed position, the locking rod engages with at least one of the plurality of detents and the armrest is immobilized in a locked position.

In yet another aspect of the present disclosure, when the button is in the pressed position, locking rod is displaced in a direction opposite to a direction of the bias of the biasing member, the locking rod disengages with at least one of the plurality of detents, and the armrest is movable in an unlocked position.

In yet another aspect of the present disclosure, the plurality of detents further includes a first end detent; and a second end detent. The first end detent engages with the locking rod to limit upward movement of the armrest and the second end detent engages with the locking rod to limit downward movement of the armrest.

In yet another aspect of the present disclosure, a first vertical distance between each of the plurality of detents is about 10 mm, and a second vertical distance from the down position and the up position is between about 10 mm and about 40 mm.

In yet another aspect of the present disclosure, the second vertical distance is between about 20 mm and about 30 mm.

In yet another aspect of the present disclosure, the rod guide is mounted at an angle, and as the armrest is moved between the down position and the up position, the armrest moves longitudinally between about 5 mm and about 20 mm.

In yet another aspect of the present disclosure, as the armrest is moved between the down position and the up position, the armrest moves laterally relative to a centerline of the motor vehicle up to about 6 mm.

In yet another aspect of the present disclosure, a dynamic adjustable armrest includes a bracket supporting the armrest, a rod guide mounted to a structural support of a motor vehicle passenger compartment, the rod guide having a plurality of detents, including at least a first end detent and a second end detent, the rod guide in slidable communication with the bracket, and a locking rod engageable with the rod guide and the bracket, and the locking rod is selectively engageable with each of the plurality of detents, the locking rod movable between at least a first position and a second position, and the armrest is movable between at least an up position and a down position, and a biasing member biases the locking rod towards the first position. The dynamic adjustable armrest further includes a button, the button movable between at least an unpressed position and a pressed position. When the button is in the unpressed position, the locking rod engages with at least one of the plurality of detents and the armrest is immobilized in a locked position, and when the button is in the pressed position, locking rod is displaced in a direction opposite to a direction of the bias of the biasing member, the locking rod disengages with at least one of the plurality of detents, and the armrest is movable in an unlocked position. The first end detent engages with the locking rod to limit upward movement of the armrest and the second end detent engages with the locking rod to limit downward movement of the armrest, a first vertical distance between each of the plurality of detents is about 10 mm, and a second vertical distance from the down position and the up position is between about 20 mm and about 30 mm. The rod guide is mounted at an angle. As the armrest is moved between the down position and the up position, the armrest moves longitudinally between about 12 mm and about 15 mm, the armrest moves laterally relative to a centerline of the motor vehicle between about 2 mm and about 6 mm.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 8A is a transparent view of a motor vehicle door having a dynamic adjustable armrest according to an aspect of the present disclosure; and FIG. 8B is a transparent sectional front view of the motor vehicle door of FIG. 8A according to an aspect of the present disclosure.

DETAILED DESCRIPTION

Figure 1:
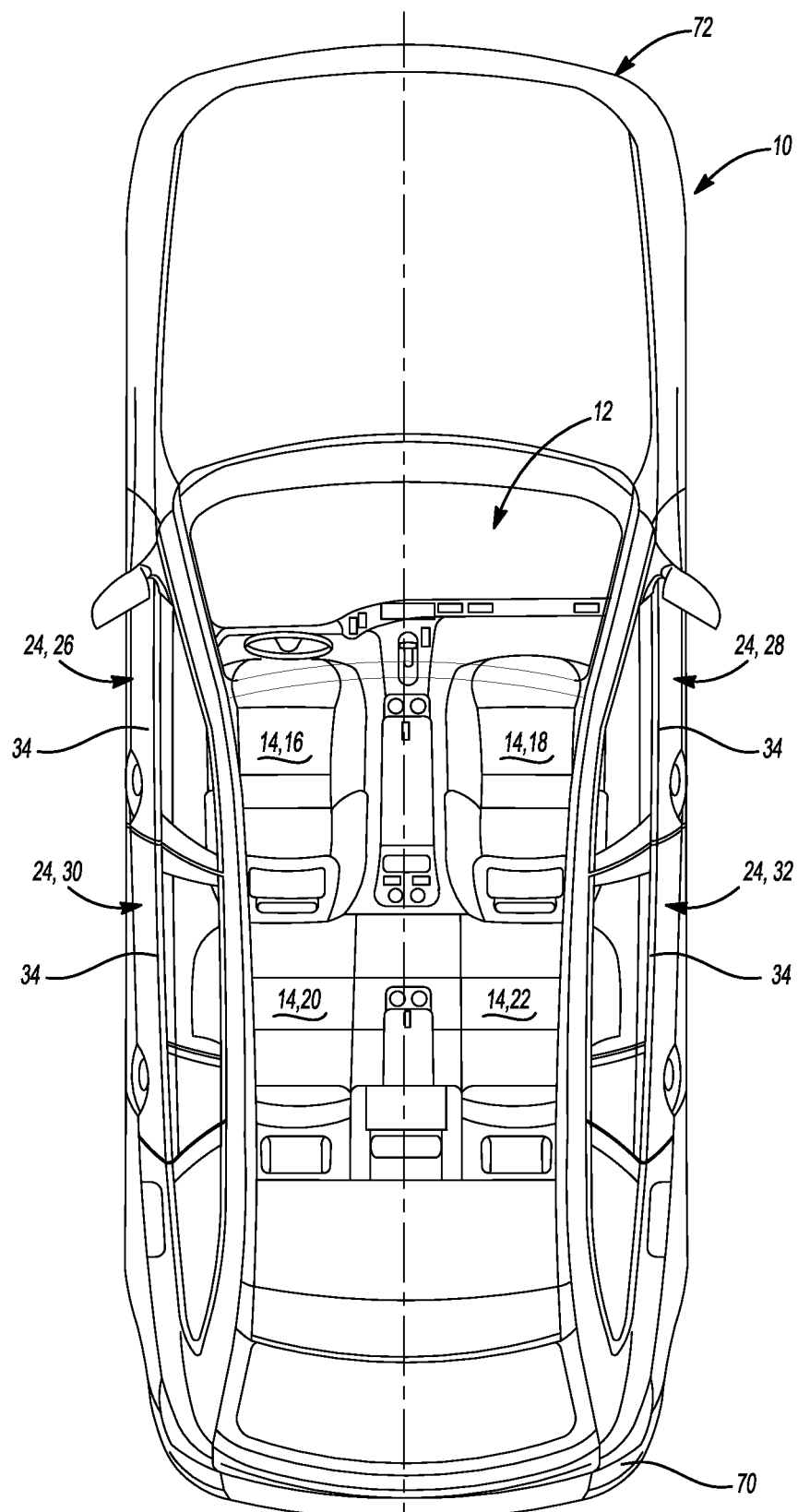
FIG. 1 is an environmental view of a motor vehicle having a dynamic adjustable armrest according to an aspect of the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. Likewise, the terms "forward", "rear", "inner", "inwardly", "outer", "outwardly", "above", and "below" are terms used relative to the orientation of the motor vehicle as shown in the drawings of the present application. Thus, "forward" refers to a direction toward a front of a motor vehicle, "rearward" refers to a direction toward a rear of a motor vehicle, "passenger" refers to a direction towards a passenger side of the motor vehicle (right-hand side in the context of this particular application), "driver" or "driver side" refers to a direction towards the driver's side of the motor vehicle (right-hand side in the context of this particular application), "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all storage compartmentations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application, or uses.

Referring now to FIG. 1 a motor vehicle is shown and generally indicated by reference number 10. While the motor vehicle is illustrated as a car, it should be appreciated that the motor vehicle 10 may be any type of vehicle including a car, a van, a truck, a bus a motor home, an aircraft, a spacecraft, a water craft, or any other such vehicle without departing from the scope or intent of the present disclosure. The motor vehicle 10 includes a passenger compartment 12 having a plurality of seats 14 including a driver seat 16, a passenger seat 18, a left rear seat 20, and a right rear seat 22. The motor vehicle 10 also includes a plurality of doors 24. The driver seat 16 is positioned proximate a driver door 26, and the passenger seat 18 is positioned proximate a passenger door 28. In some examples, the left rear seat 20 is positioned proximate left rear door 30 and the right rear seat 22 is positioned proximate a right rear door 32. It should be appreciated, that depending on the particular motor vehicle 10, each of the plurality of seats 14 may be placed proximate at least one of the plurality of doors 24. However, it should be appreciated that depending on the type and construction of a given motor vehicle 10, the quantity of doors 24 and the quantity of seats 14 proximate the doors 24.

Figure 2A:
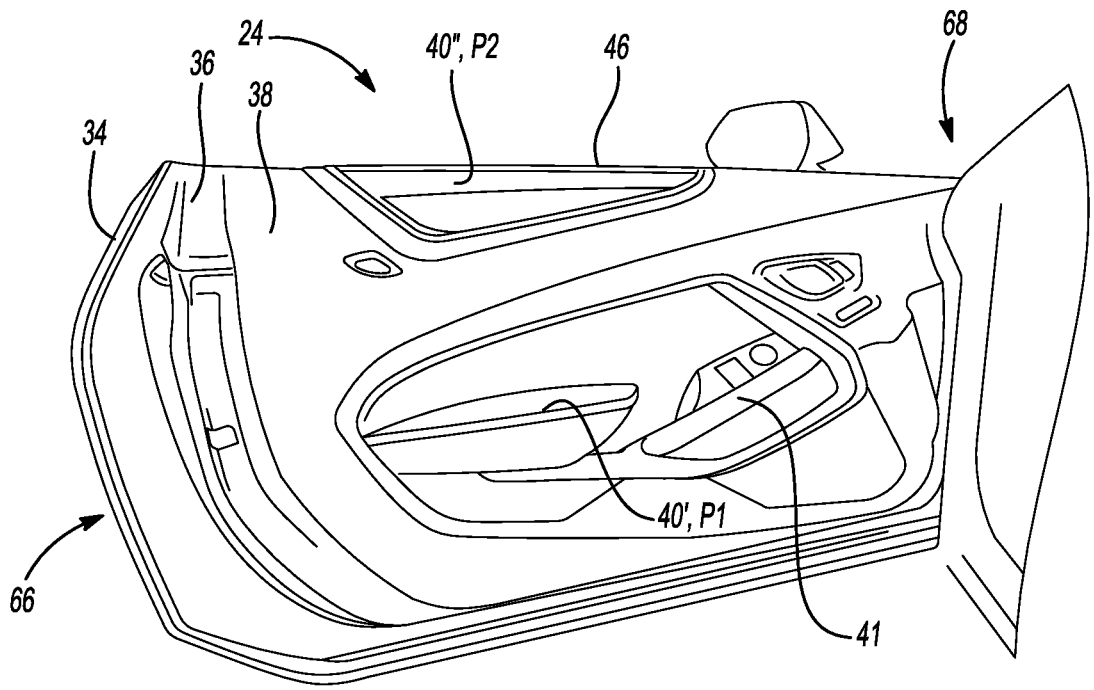
FIG. 2A is a perspective view of a motor vehicle door having an interior door trim panel with dynamic adjustable armrests in a first position according to an aspect of the present disclosure.
Figure 2B:
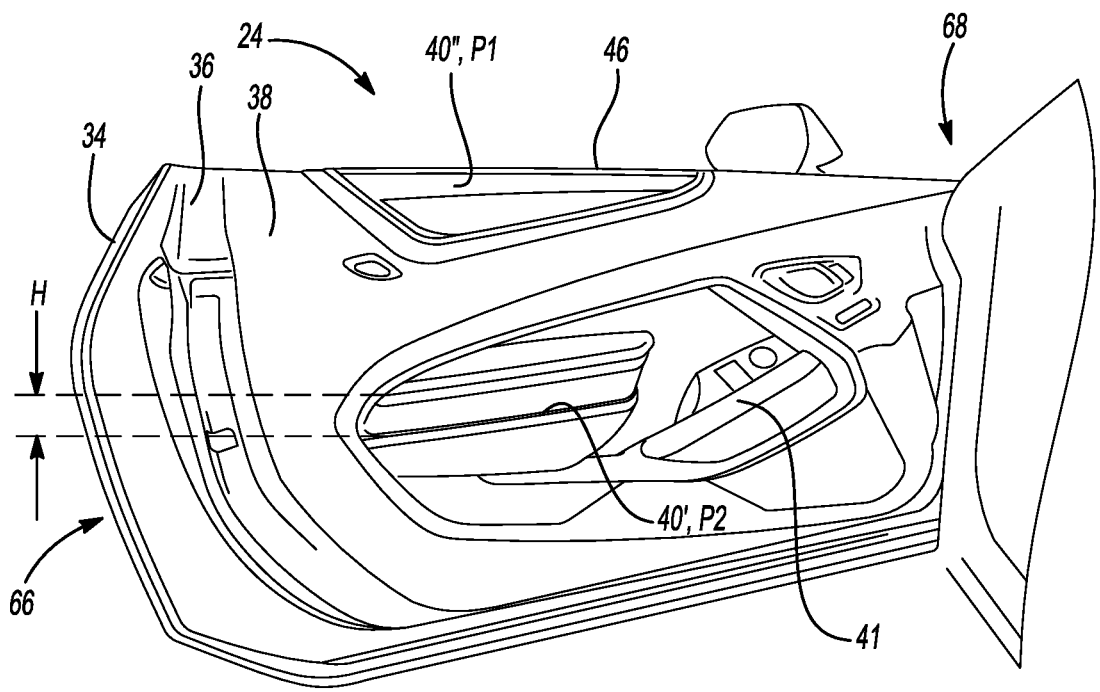
FIG. 2B is a perspective view of a motor vehicle door having an interior door trim panel with dynamic adjustable armrests in a second position according to an aspect of the present disclosure.

Referring now to FIGS. 2A and 2B, and with continuing reference to FIG. 1, in several aspects, each of the plurality of doors 24 is has an exterior door skin 34 a door inner panel 36, and an interior door trim panel 38. The interior door trim panel 38 is an aesthetically and ergonomically designed component of the motor vehicle 10 passenger compartment 12. The interior door trim panel 38 is supported via a plurality of connectors (not specifically shown), such as screws, bolts, nuts, rivnuts, rivets, adhesives, press-fit fasteners, or the like, on the door inner panel 36. The exterior door skin 34 is affixed to a structural frame (not specifically shown) of the door 24, via a plurality of mechanical fasteners (not shown), such as rivets, bolts, rivnuts, screws; or the like or chemical fasteners (not shown), such as adhesives, glues, or the like; or other bonding processes such as braising, welding, or the like. The interior door trim panel 38 is formed of any of a variety of different materials including plastics, metals, vinyl, leather, wood, and other such materials. In several aspects, the interior door trim panel 38 is equipped with an armrest 40. Additional armrests 40 may be disposed between occupants of the motor vehicle 10, such as between the pilot and copilot and/or passenger seats 14 on an aircraft (not shown), between passenger seats 14 on a watercraft (not shown), between passenger seats 14 on a bus (not shown), or the like without departing from the scope or intent of the present disclosure. The armrests 40 equipped to the doors 24 of the motor vehicle 10 are aesthetically designed to complement other features and aspects of the passenger compartment 12, as well as being structurally and ergonomically designed to support appendages of motor vehicle 10 occupants. For example, the armrests 40 are operable to support the arms, elbows, wrists, hands, and the like of the motor vehicle 10 occupants.

In several aspects, the armrests 40 include comfort features 42 such as flexible or pliable foam materials disposed beneath a covering surface 44, such as leather, vinyl, or other such materials. In some applications, a plurality of armrests 40 may be disposed on a given door 24. For example, a first armrest 40' is disposed along a central portion of the door 24, proximate an interior door handle 41. A second armrest 40" is disposed along a beltline or upper door trim edge 46 of the door 24. Accordingly, depending on the physical characteristics of the occupants of the motor vehicle 10, the occupant may rest his or her elbow, arm, wrist, hand, or the like on either of the first or the second armrests 40', 40". Moreover, in several aspects, the armrests 40, including the first and second armrests 40', 40", may be dynamically adjustable.

Figure 3:
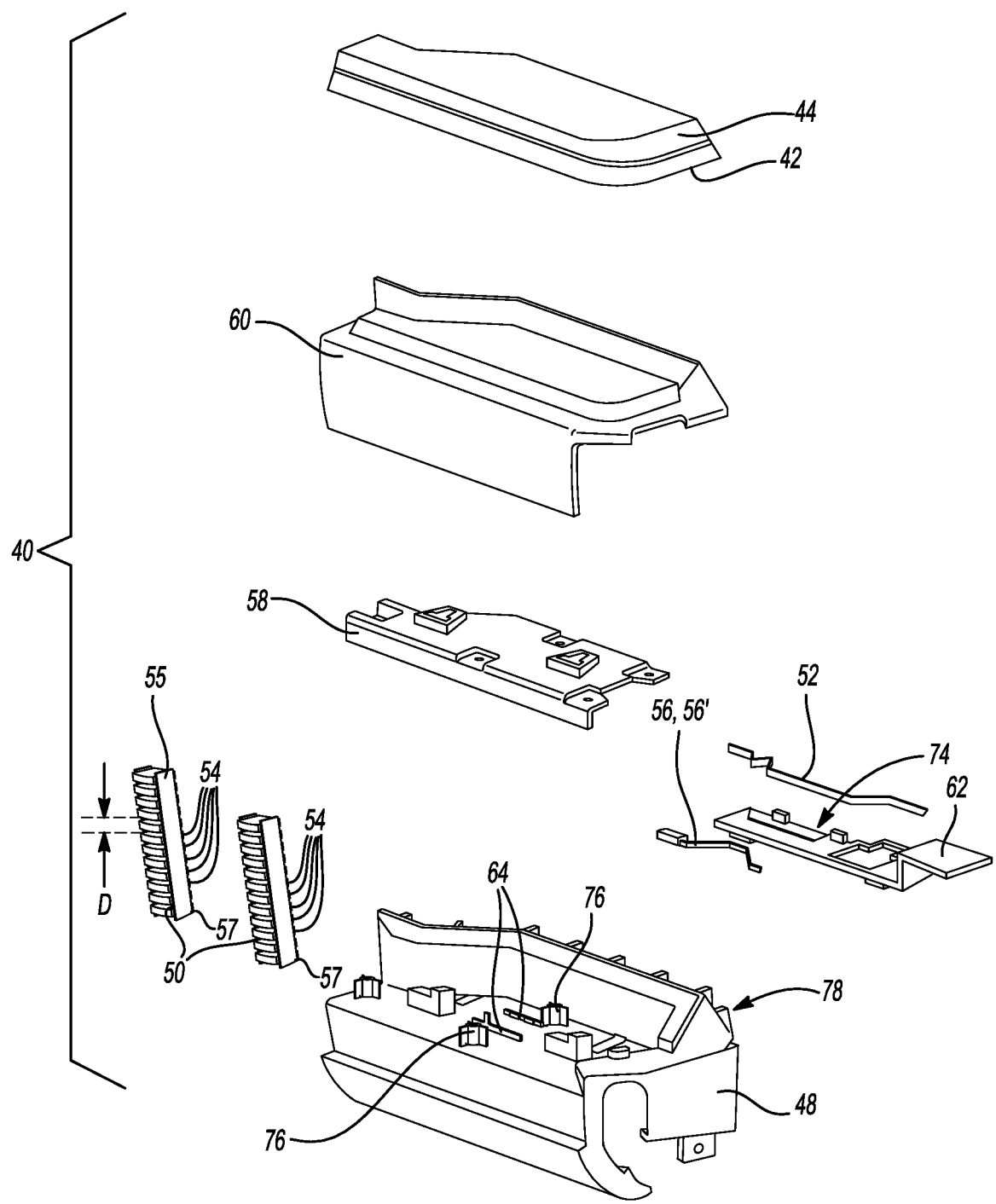
FIG. 3 is an exploded diagram of a dynamic adjustable armrest according to an aspect of the present disclosure.
Figure 4A:
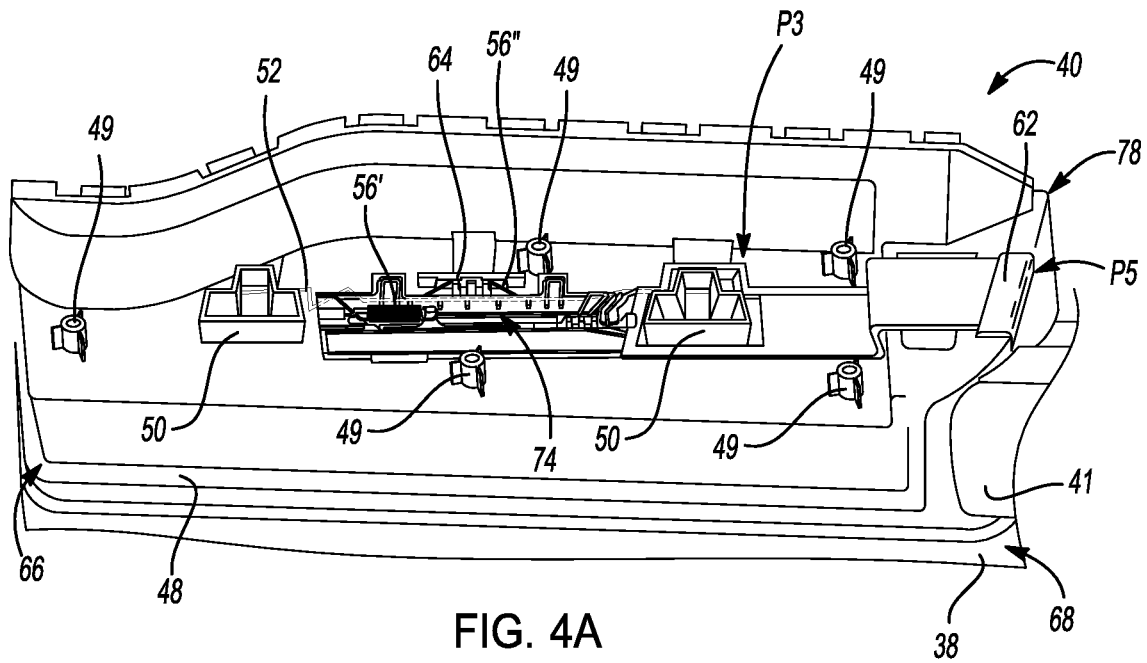
FIG. 4A is a partial perspective view of a dynamic adjustable armrest in a locked position according to an aspect of the present disclosure.
Figure 4B:
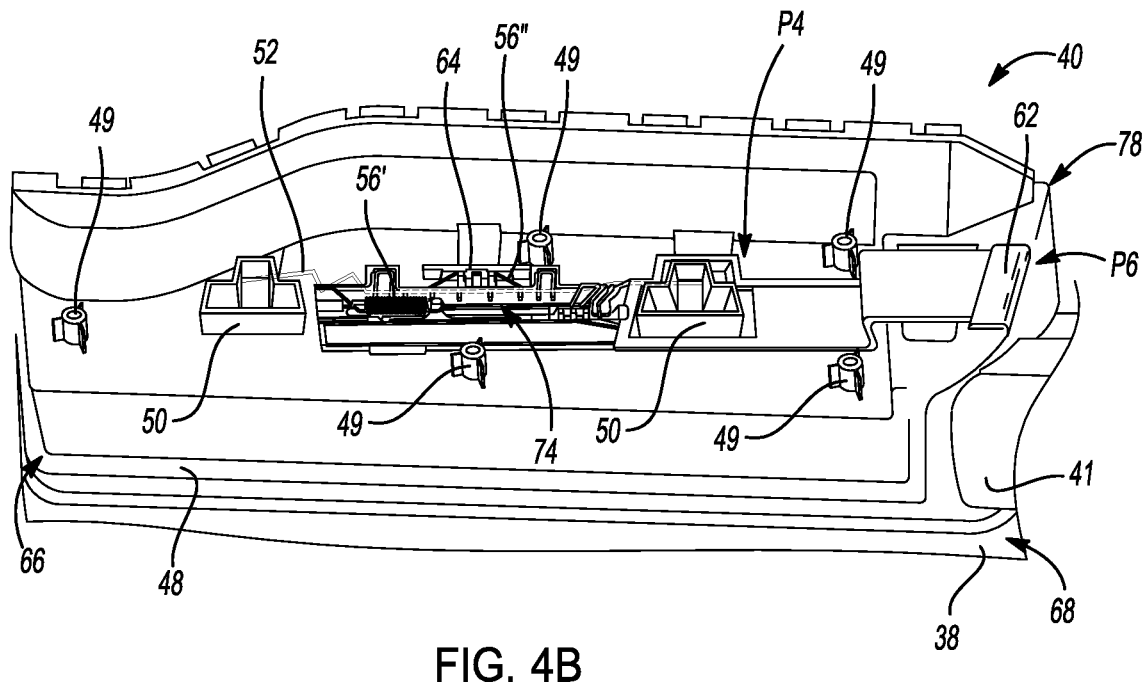
FIG. 4B is a partial perspective view of a dynamic adjustable armrest in an unlocked position according to an aspect of the present disclosure.

Turning now to FIGS. 3, 4A and 4B, and with continuing reference to FIGS. 1-2B, the armrests 40 of the present disclosure are dynamically adjustable between at least a first or down position "P1", and a second or up position "P2." In some examples, when in the down position "P1", the armrest 40 is substantially flush with contours of the interior door trim panel 38. However, it should be appreciated that depending on the design and structure of the interior door trim panel 38, on which the armrest 40 is disposed, when in the down position "P1", the armrest 40 of some examples may be disposed substantially below or recessed from neighboring contours of the interior door trim panel 38 without departing from the scope or intent of the present disclosure. By contrast, when the armrest 40 is in the up position "P2", in several aspects the armrest 40 is raised to be at least flush with, and in some examples, substantially above neighboring contours and/or features of the interior door trim panel 38. In one example, a vertical distance or height "H" traversed by the armrest 40 as the armrest 40 moves between the down position "P1" and the up position "P2" is about 10 mm to about 40 mm. In another example, the vertical distance or height "H" traversed by the armrest 40 as the armrest 40 moves between the down position "P1" and the up position "P2" is about 20 mm to about 30 mm. In some applications, a storage compartment (not specifically shown) may be hidden beneath the armrest 40 and accessible by occupants of the motor vehicle 10 when the armrest 40 is in the up position "P2." Accordingly, the storage compartment may be hidden by moving the armrest 40 to the down position "P1."

Because the armrest 40 is dynamically movable or adjustable, the armrest 40 is supported on a bracket 48. The bracket 48 is a structural component formed of metal, plastics, composite materials or the like, and capable of withstanding forces imparted to the armrest 40 by occupants of the motor vehicle 10 without substantial deflection. The bracket 48 is mounted to the door inner panel 36 by a plurality of attachment features 49. In several aspects, the attachment features 49 include screws, bolts, nuts, rivnuts, rivets, adhesives, press-fit fasteners, or the like. The bracket 48 also supports a plurality of features used to selectively allow vertical movement of the armrest 40 relative to the bracket 48, and more generally, to allow movement of the armrest 40 relative to the interior door trim panel 38. Specifically, the bracket 48 supports a rod guide 50, and a locking rod 52. The locking rod 52 is movable between at least a first or locked position "P3" and a second or unlocked position "P4." In the locked position "P3", the locking rod 52 is engaged in at least one of a plurality of detents 54 formed in the rod guide 50. In several aspects, each of the plurality of detents 54 is spaced apart from the next of the plurality of detents 54 by a distance "D". In some examples, in order to provide sufficient granularity in movement of the armrest 40, the distance "D" is between about 0 mm and about 15 mm. In some examples, the distance "D" is about 5 mm, and in other examples, the distance "D" is about 10 mm. In further aspects, the plurality of detents 54 includes at least a first end detent 55 and a second end detent 57. The first and second end detents 55, 57 are protrusions within the rod guide 50 that are permanent fixtures within the rod guide 50. That is, the first and second end detents 55, 57 prevent or otherwise limit over-movement of the locking rod 52, and thereby prevent or limit over-extension of the armrest 40 as the armrest 40 is moved. A biasing member 56, such as a spring, biases the locking rod 52 towards the locked position "P3." The biasing member 56 may take any of a variety of forms without departing from the scope or intent of the present disclosure. In some examples, the biasing member 56 is a linear spring, a coil spring, a leaf spring, a mechanical, hydraulic, or pneumatic actuator, or the like. The rod guide 50 is also a movable component of the dynamically adjustable armrest 40 and is operable to selectively allow movement of the armrest 40 between the up position "P2" and the down position "P1." In several aspects, the rod guide 50 is in slidable communication with the bracket 48 to allow the movement of the armrest 40 between the down position "P1" and the up position "P2." In some examples, the dynamically adjustable armrest 40 also includes a bracket cover 58 and an armrest cover 60. The bracket cover 58 is a functional component of the armrest 40 that limits the potential for dust, dirt, and other objects from entering the bracket 48 and possibly impeding operation of the bracket 48, rod guide 50, locking rod 52, and the like. The armrest cover 60 performs substantially similar functions to the bracket cover 58, and additionally forms an aesthetically appealing and ergonomically robust cover for the bracket 48, rod guide 50, locking rod 52, and other componentry disposed beneath the comfort features 42 and covering surface 44 of the armrest 40.

The dynamically adjustable armrest 40 also includes a button 62. In several aspects, the button 62 is movable between at least an unpressed or locked position "P5" and a pressed or unlocked position "P6." In the unpressed position, the locking rod 52 engages with at least one of the plurality of detents 54 of the rod guide 50 and the armrest 40 is immobilized or locked in position. By contrast, when the button 62 is in the pressed position "P6", the locking rod 52 is disengaged from the rod guide 50 and the armrest 40 is free to move in a direction supported by the rod guide 50 and the bracket 48 between the down position "P1" and the up position "P2," or vice versa. More specifically, when the button 62 is in the pressed position "P6", the locking rod 52 is mechanically, electrically, or hydraulically displaced in a direction opposite to the direction of the bias of the biasing member 56.

Figure 5A:
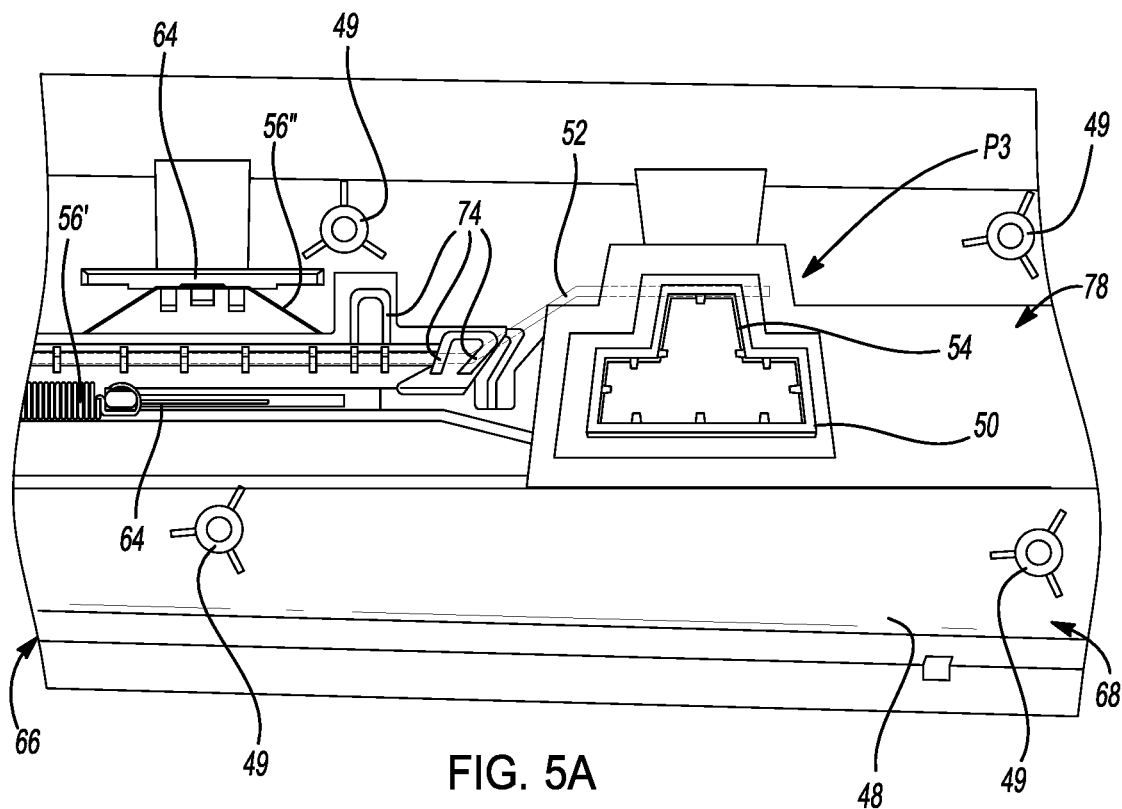
FIG. 5A is a partial perspective view of a portion of a dynamic adjustable armrest showing a locking rod in a locked position according to an aspect of the present disclosure.
Figure 5B:
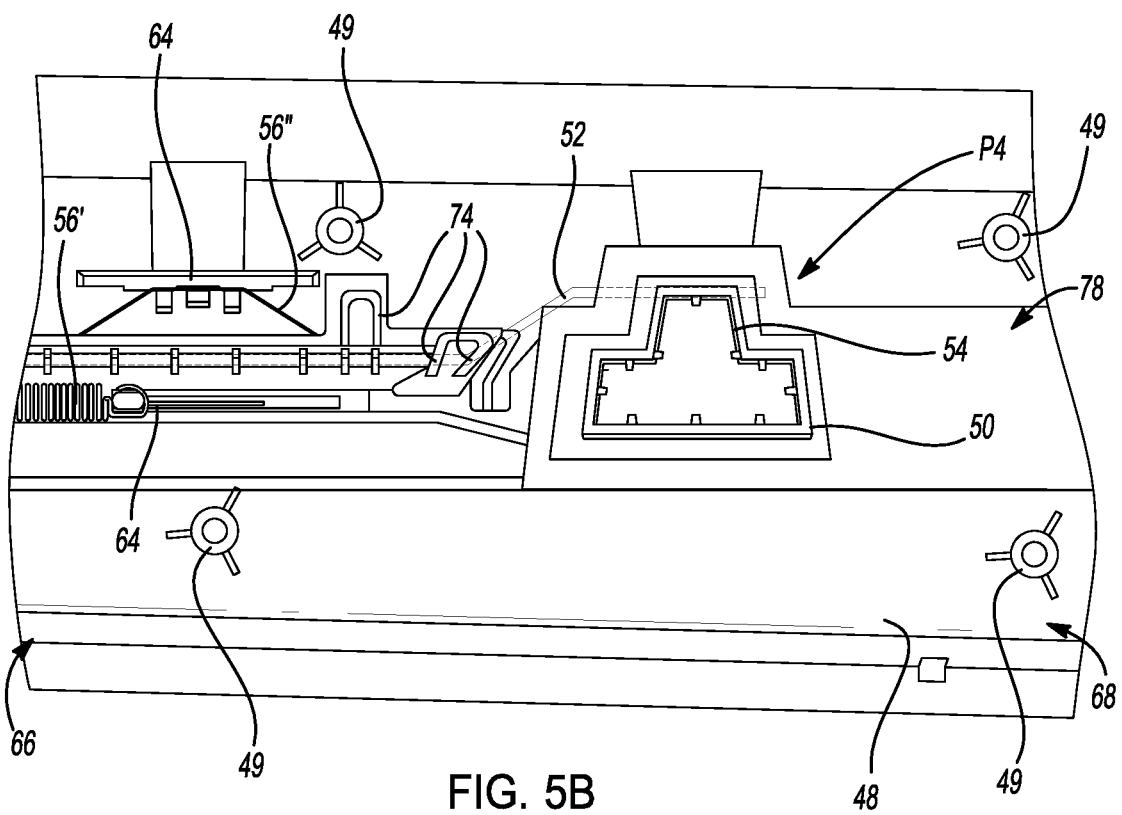
FIG. 5B is a partial perspective view of a portion of a dynamic adjustable armrest showing a locking rod in an unlocked position according to an aspect of the present disclosure.

Turning now to FIGS. 5A and 5B, and with continuing reference to FIGS. 1-4B, in one example, the button 62 is a mechanical apparatus disposed within a track 64 of the bracket 48. In some aspects, the track 64 is formed unitarily with, or molded with the bracket 48 while in other examples, the track 64 is at least one separate component that is affixed to the bracket 48 during assembly. The track 64 generally includes a plurality of guiding features that retain and limit motion of the button 62 to a predetermined direction. In the examples of FIGS. 4A-5B, the track 64 limits motion of the button 62 to a longitudinal direction that is substantially parallel to a longitudinal aspect of the door 24 and therefore, of the motor vehicle 10.

In some aspects, a single biasing member 56 may provide bias against movement of both the locking rod 52 and the button 62. For example, movement of the button 62 between the unpressed position "P5" and the pressed position "P6" is resisted by the biasing member 56. However, a plurality of biasing members 56 may be used with the button 62, the locking rod 52 and the bracket 48 without departing from the scope or intent of the present disclosure. For example a first biasing member 56' is connected to the track 64 and the button 62 and resists longitudinal motion of the button 62 relative to the track 64. The first biasing member 56' operates as a return spring and both resists motion of the button 62 from the unpressed position "P5" to the pressed position "P6," and returns the button 62 to the unpressed position "P5" after an occupant has moved the button 62 to the pressed position "P6." A second biasing member 56" is connected to the track 64 and contacts the locking rod 52, thereby biasing the locking rod 52 into the locked position "P3". The second biasing member 56" also operates as a return spring that both resists motion of the locking rod 52 from the locked position "P3" to the unlocked position "P4" and returns the locking rod 52 from the unlocked position "P4" to the locked position "P3" when an occupant has used the button 62 to move the locking rod 52 to the unlocked position "P4" from the locked position "P3."

However, as the button 62 is moved from the unpressed position "P5" shown in FIG. 4A to the pressed position "P6" shown in FIG. 4B the button 62 apparatus moves towards the left-hand side of FIGS. 4A and 4B. The left-hand side of FIGS. 4A and 4B represents a rear portion 66 of the interior door trim panel 38, while the right-hand side of FIGS. 4A and 4B represents a front portion 68 of the interior door trim panel 38 relative to a rear 70 and a front 72 of the motor vehicle 10 respectively. As the button 62 moves towards the rear portion 66 of the interior door trim panel 38, the locking rod 52 is carried by molded features 74 of the button 62 in conjunction with interfacing features 76 of the bracket 48 to move towards the rear portion 66 as well. The molded features 74 of the button 62 of some examples are formed unitarily with the button 62 and when assembled in the armrest 40, engage with and carry the locking rod 52 such that movement of the button 62 translates to movement of the locking rod 52. However, because movement of the button 62 is substantially linear, in order to disengage the locking rod 52 from the rod guide 50 when the button 62 is moved to the pressed position P6, the locking rod 52 of some examples must also move in a direction other than the linear direction of movement of the button 62. The interfacing features 76 of the bracket 48 interact with the molded features 74 of the button 62 and engage with the locking rod 52 to deflect the locking rod 52 as the button 62 travels along the track 64. More specifically, the locking rod 52 is deflected from the direction of travel of the button 62 such that the locking rod 52 moves laterally relative to the movement of the button 62. In some examples, the lateral movement of the locking rod 52 is substantially orthogonal to the movement of the button 62, however other angular deflections may be used without departing from the scope or intent of the present disclosure.

Figure 6:
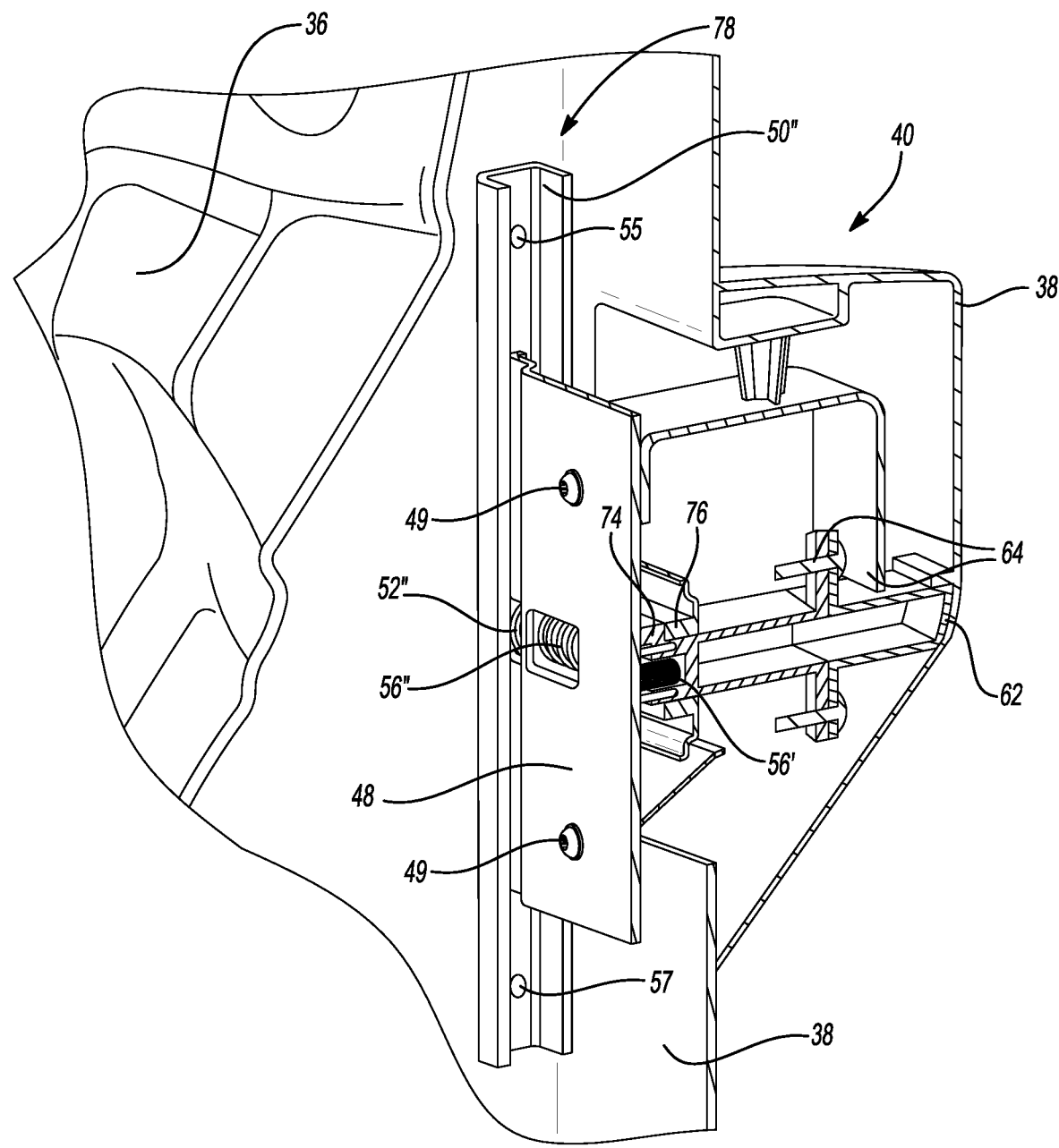
FIG. 6 is a partial perspective top section view of a portion of a dynamic adjustable armrest according to an aspect of the present disclosure.
Figure 7:
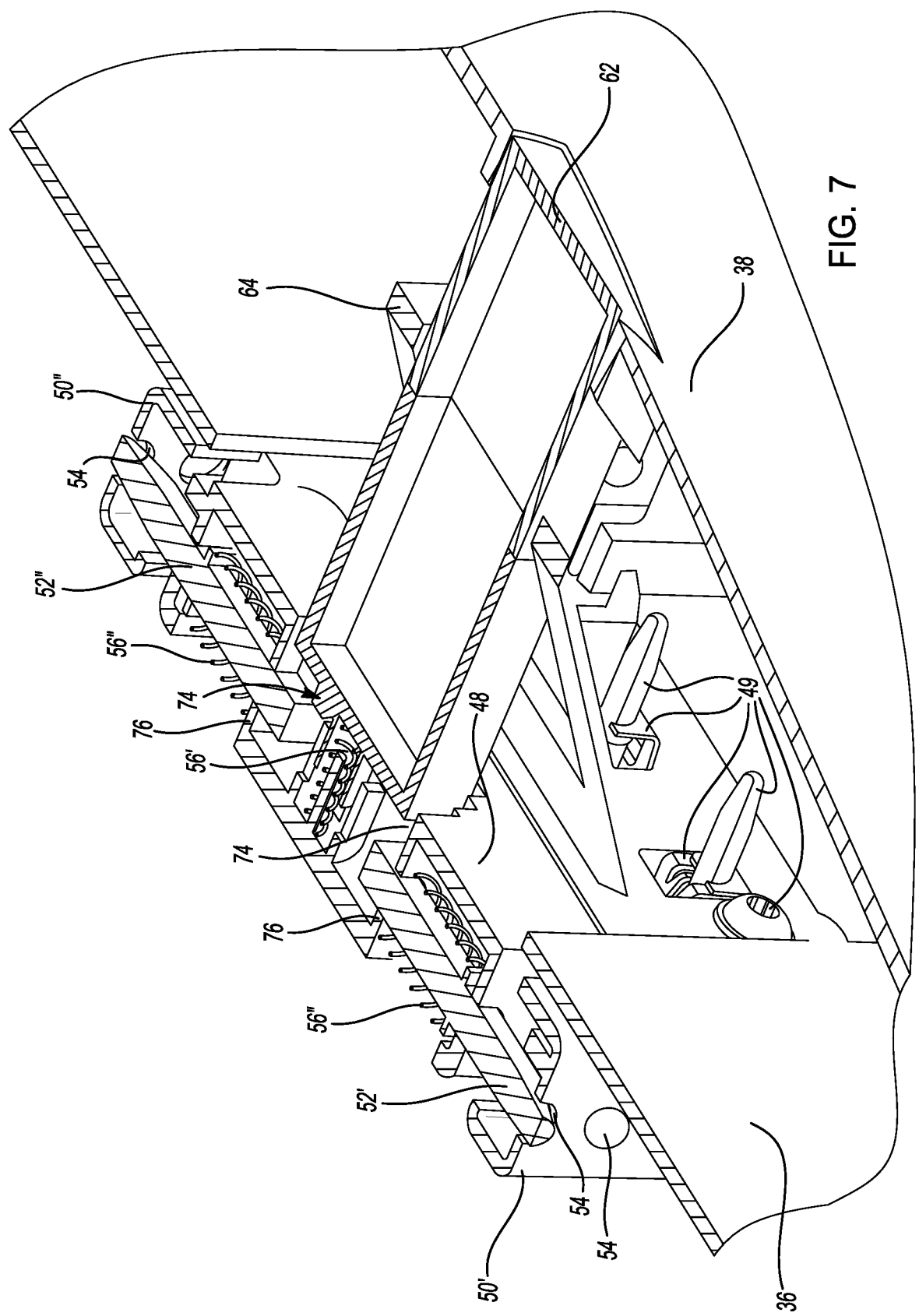
FIG. 7 is a partial perspective front section view of a portion of a dynamic adjustable armrest according to an aspect of the present disclosure.

Turning now to FIGS. 6 and 7, and with continuing reference to FIGS. 1-5B, another example of the dynamic adjustable armrest 40 is shown in partial cross-sectional view. Whereas in FIGS. 3-5B, the dynamic adjustable armrest 40 is shown with the button 62 disposed towards the front portion 68 of the interior door trim panel 38, the dynamic adjustable armrest 40 of FIGS. 6 and 7 is oriented such that the button 62 faces inwards relative to the motor vehicle 10. That is, the button 62 faces the occupant of the motor vehicle 10. The button 62 includes substantially the same features as those discussed above with respect to FIGS. 1-5B, and therefore like components are labeled with like reference numbers. In some aspects, the dynamic adjustable armrest 40 of FIGS. 6 and 7 includes a first locking rod 52' disposed within a first rod guide 50' and a second locking rod 52" disposed within a second rod guide 50". When an occupant presses the button 62 of FIGS. 6 and 7, the button 62 moves against the first biasing member 56' and towards the exterior door skin 34 of the door 24. Movement of the button 62 is then translated by the molded features 74 of the button 62 and the interfacing features 76 of the bracket 48 into longitudinal motion of each of the first and second locking rods 52', 52". More specifically, movement of the button 62 is translated into movement of the first locking rod 52' away from the rear portion 66 of the interior door trim panel 38, and movement of the second locking rod 52" away from the front portion 68 of the interior door trim panel 38. Thus, when the button 62 is in the pressed position "P6", the first and second locking rods 52', 52" are moved away from the plurality of detents 54 in the first and second rod guides 50', 50" thereby allowing movement of the armrest 40 relative to the interior door trim panel 38. Likewise, when the button 62 is released and reverts back to the unpressed position "P5", the first and second locking rods 52', 52" are biased towards and engage with at least one of the plurality of detents 54 in the first and second rod guides 50', 50" by the second biasing members 56".

Turning now to FIGS. 8A and 8B, and with continuing reference to FIGS. 1-7, the bracket 48 of the dynamic adjustable armrest 40 is mounted to the motor vehicle 10 door 24. Motor vehicle 10 occupants come in a wide variety of shapes and sizes. Accordingly, in order to provide a comfortable, safe, and broadly useable armrest 40 for each and every potential occupant of the motor vehicle 10, the dynamic adjustable armrest 40 moves in a substantially linear fashion along the rod guides 50. However, the linear movement of the dynamic adjustable armrest 40 is augmented by placing the armrests 40 in carefully determined positions and orientations on the motor vehicle 10 doors 24. That is, while substantially linear movement of the armrest 40 in either a vertical, longitudinal, or lateral direction, relative to the interior door trim panel 38 would confer to occupants a substantial benefit in terms of comfort, safety, and the like, additional benefits are available. Specifically, by mounting the bracket 48 at an angle, and therefore, by causing the armrest 40 to move along the rod guides 50 at an angle, the armrest 40 may move in vertical, lateral, and longitudinal directions all at the same time while still moving substantially linearly. While the bracket 48 has been described as being mounted at an angle, it should be appreciated that in order to provide sufficient adjustability, the bracket 48 may more accurately be described as being mounted to the door inner panel 36 at a plurality of angles.

In FIG. 8A, for example, the bracket 48 is mounted to the door inner panel 36 at an angle rotated from vertical, thereby tilting a top portion 78 of the bracket 48 towards the front 72 of the motor vehicle 10. The precise angle at which the bracket 48 is tilted or rotated towards the front 72 of the motor vehicle 10 may vary substantially depending on the motor vehicle 10 and the seating position, size of the passenger compartment 12, and the like. In some examples, the bracket 48 is rotated towards the front 72 of the motor vehicle 10 by a first angle "A1" of about 0° to about 15°, and allows fore-aft or longitudinal movement of the armrest 40 for a distance "D1" of between about 5 mm and about 20 mm as the armrest 40 is moved between the down position "P1" and the up position "P2." In another example, as the armrest 40 is moved between the down position "P1" and the up position "P2", the armrest 40 moves longitudinally for the distance "D1" of between about 12 mm and about 15 mm.

In FIG. 8B, the bracket 48 is also mounted to the door inner panel 36 at a second angle "A2" such that the top portion 78 of the bracket 48 is tilted laterally inwards towards the centerline "C" of the motor vehicle 10. The precise angle at which the bracket 48 is tilted or rotated towards the centerline "C" of the motor vehicle 10 may vary substantially depending on the motor vehicle 10 and the seating position, size of the passenger compartment 12, and the like. In some examples, the bracket 48 is tilted towards the centerline "C" of the motor vehicle 10 by the second angle "A2" of about 0° to about 30°, and allows inward or lateral movement of the armrest 40 for a distance "D2" of between about 0 mm and about 6 mm as the armrest 40 is moved between the down position "P1" and the up position "P2." In another example, as the armrest 40 is moved between the down position "P1" and the up position "P2", the armrest 40 moves laterally for the distance "D2" of between about 2 mm and about 6 mm. However with respect to both the angular measures of the first and second angles "A1", "A2", and the first and second distances "D1", "D2", it should be appreciated that the exact angular measures and distances travelable by the armrest 40 may vary substantially depending on the geometry of the motor vehicle 10 and occupant safety, comfort, and ergonomics requirements without departing from the scope or intent of the present disclosure.

A dynamic adjustable armrest 40 of the present disclosure offers several advantages. These include eliminating or at least substantially reducing motor vehicle 10 occupant safety concerns, while providing a wide variety of adjustability, and improving occupant comfort for a wide variety of occupant demographics, and which may be mass produced at low cost and fitted or retrofitted to a wide variety of motor vehicle 10 platforms without requiring substantial modification of current production doors 24 or door 24 components.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A dynamic adjustable armrest comprising:
a bracket supporting the armrest;
a rod guide having a plurality of detents, the rod guide in slidable communication with the bracket;
a locking rod engageable with the rod guide and the bracket,
wherein the locking rod is movable between at least a first position and a second position, and the armrest is movable between at least an up position and a down position.

2. The dynamic adjustable armrest of claim 1, wherein the locking rod is selectively engageable with each of the plurality of detents.

3. The dynamic adjustable armrest of claim 1, further comprising a button, the button movable between at least an unpressed position and a pressed position.

4. The dynamic adjustable armrest of claim 3, wherein a biasing member biases the locking rod towards the first position.

5. The dynamic adjustable armrest of claim 3, wherein when the button is in the unpressed position, the locking rod engages with at least one of the plurality of detents, and the armrest is immobilized in a locked position.

6. The dynamic adjustable armrest of claim 4, wherein when the button is in the pressed position, locking rod is displaced in a direction opposite to a direction of bias of the biasing member, the locking rod disengages with at least one of the plurality of detents, and the armrest is movable in an unlocked position.

7. The dynamic adjustable armrest of claim 1, wherein the plurality of detents further comprises:
a first end detent; and
a second end detent,
wherein the first end detent engages with the locking rod to limit upward movement of the armrest and the second end detent engages with the locking rod to limit downward movement of the armrest.

8. The dynamic adjustable armrest of claim 1, wherein a first vertical distance between each of the plurality of detents is about 10 mm, and a second vertical distance from the down position and the up position is between about 10 mm and about 40 mm.

9. The dynamic adjustable armrest of claim 8, wherein the second vertical distance is between about 20 mm and about 30 mm.

10. The dynamic adjustable armrest of claim 8, wherein the rod guide is mounted to a structural support of a motor vehicle passenger compartment, the rod guide is mounted at an angle, and wherein as the armrest is moved between the down position and the up position, the armrest moves longitudinally between about 5 mm and about 20 mm.

11. The dynamic adjustable armrest of claim 10, wherein as the armrest is moved between the down position and the up position, the armrest moves laterally up to about 6 mm.

12. A dynamic adjustable armrest comprising:
a bracket supporting the armrest;
a rod guide mounted to a structural support of a motor vehicle passenger compartment, the rod guide having a plurality of detents, the rod guide in slidable communication with the bracket; and
a locking rod engageable with the rod guide and the bracket, and the locking rod is selectively engageable with each of the plurality of detents,
wherein the locking rod is movable between at least a first position and a second position, and the armrest is movable between at least an up position and a down position, and wherein a biasing member biases the locking rod towards the first position.

13. The dynamic adjustable armrest of claim 12, further comprising a button, the button movable between at least an unpressed position and a pressed position, wherein when the button is in the unpressed position, the locking rod engages with at least one of the plurality of detents and the armrest is immobilized in a locked position.

14. The dynamic adjustable armrest of claim 13, wherein when the button is in the pressed position, locking rod is displaced in a direction opposite to a direction of the bias of the biasing member, the locking rod disengages with at least one of the plurality of detents, and the armrest is movable in an unlocked position.

15. The dynamic adjustable armrest of claim 12, wherein the plurality of detents further comprises:
a first end detent; and
a second end detent,
wherein the first end detent engages with the locking rod to limit upward movement of the armrest and the second end detent engages with the locking rod to limit downward movement of the armrest.

16. The dynamic adjustable armrest of claim 12, wherein a first vertical distance between each of the plurality of detents is about 10 mm, and a second vertical distance from the down position and the up position is between about 10 mm and about 40 mm.

17. The dynamic adjustable armrest of claim 16, wherein the second vertical distance is between about 20 mm and about 30 mm.

18. The dynamic adjustable armrest of claim 16, wherein the rod guide is mounted at an angle, and wherein as the armrest is moved between the down position and the up position, the armrest moves longitudinally between about 5 mm and about 20 mm.

19. The dynamic adjustable armrest of claim 12, wherein as the armrest is moved between the down position and the up position, the armrest moves laterally relative to a centerline of the motor vehicle up to about 6 mm.

20. A dynamic adjustable armrest comprising:
a bracket supporting the armrest;
a rod guide mounted to a structural support of a motor vehicle passenger compartment, the rod guide having a plurality of detents, including at least a first end detent and a second end detent, the rod guide in slidable communication with the bracket; and a locking rod engageable with the rod guide and the bracket, and the locking rod is selectively engageable with each of the plurality of detents, the locking rod movable between at least a first position and a second position, and the armrest is movable between at least an up position and a down position, and wherein a biasing member biases the locking rod towards the first position;

a button, the button movable between at least an unpressed position and a pressed position, wherein when the button is in the unpressed position, the locking rod engages with at least one of the plurality of detents and the armrest is immobilized in a locked position, and when the button is in the pressed position, locking rod is displaced in a direction opposite to a direction of the bias of the biasing member, the locking rod disengages with at least one of the plurality of detents, and the armrest is movable in an unlocked position, and wherein the first end detent engages with the locking rod to limit upward movement of the armrest and the second end detent engages with the locking rod to limit downward movement of the armrest, a first vertical distance between each of the plurality of detents is about 10 mm, and a second vertical distance from the down position and the up position is between about 20 mm and about 30 mm, and wherein the rod guide is mounted at an angle, and wherein as the armrest is moved between the down position and the up position, the armrest moves longitudinally between about 12 mm and about 15 mm, the armrest moves laterally relative to a centerline of the motor vehicle between about 2 mm and about 6 mm.

\* \* \* \* \*